(12) United States Patent  
Fleming et al.

(10) Patent No.: US 7,946,133 B2  
(45) Date of Patent: May 24, 2011

(54) METHODS FOR MODIFYING OVALITY OF OPTICAL FIBER PREFORMS

(75) Inventors: James William Fleming, Westfield, NJ (US); Siu-Ping Hong, Alpharetta, GA (US); Paul Francis Glodis, Atlanta, GA (US); Thomas John Miller, Alpharetta, GA (US); Zhi Zhou, Lawrenceville, GA (US); David Kalish, Roswell, GA (US); Shunhe Xiong, Alpharetta, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 12/945,133

(22) Filed: Nov. 12, 2010

(65) Prior Publication Data

US 2011/0056245 A1     Mar. 10, 2011

Related U.S. Application Data

(60) Continuation of application No. 11/672,836, filed on Feb. 8, 2007, now abandoned, which is a division of application No. 10/430,779, filed on May 5, 2003, now abandoned.

(51) Int. Cl.  
     *C03B 37/012*        (2006.01)

(52) U.S. Cl. ................ 65/377; 65/391; 65/382; 65/429; 65/376; 65/404

(58) Field of Classification Search ............. 65/377, 65/391, 429, 382, 376, 404  
See application file for complete search history.

(56) References Cited

U.S. PATENT DOCUMENTS

| | | | |
|---|---|---|---|
| 4,312,653 A | 1/1982 | Schneider et al. |
| 4,486,214 A | 12/1984 | Lynch et al. |
| 5,000,771 A | 3/1991 | Fleming, Jr. et al. |
| 5,192,350 A | 3/1993 | Le Sergent |
| 5,221,306 A | 6/1993 | Fleming, Jr. et al. |
| 5,298,047 A | 3/1994 | Hart, Jr. et al. |
| 5,397,372 A | 3/1995 | Partus et al. |
| 5,897,679 A | 4/1999 | Anderson et al. |
| 6,094,941 A | 8/2000 | Fujinoki et al. |
| 6,122,935 A | 9/2000 | Glodis et al. |

(Continued)

FOREIGN PATENT DOCUMENTS

EP      0439918 A1     8/1991

(Continued)

OTHER PUBLICATIONS

Phase (waves) from wikipedia.org. downloaded Jul. 7, 2010, pp. 1-5.

*Primary Examiner* — John Hoffmann  
(74) *Attorney, Agent, or Firm* — Sutherland Asbill & Brennan LLP

(57) ABSTRACT

Methods for modifying preform core ovality during and subsequent to the formation of an optical fiber preform. After MCVD deposition forms the core rod, but prior to overcladding of the core rod, the code rod may be etched to change its ovality. In order to etch the core rod, the core rod may be mounted to lathe, rotated by at least two rotors, and subjected to a heat source. Additionally, one of the at least two rotors may be phase-shifted from another one of the at least two rotors after the core rod is mounted on the lathe.

9 Claims, 9 Drawing Sheets

U.S. PATENT DOCUMENTS

| | | |
|---|---|---|
| 6,209,354 B1 | 4/2001 | Fujinoki et al. |
| 6,279,353 B1 * | 8/2001 | Wada et al. ................... 65/407 |
| 6,408,653 B1 | 6/2002 | Oh et al. |
| 6,460,378 B1 | 10/2002 | Dong et al. |
| 6,481,721 B1 | 11/2002 | Mueller et al. |
| 2007/0125127 A1 | 6/2007 | Fleming, Jr. et al. |

FOREIGN PATENT DOCUMENTS

| | | |
|---|---|---|
| EP | 0484035 A1 | 5/1992 |
| EP | 0582405 A1 | 2/1994 |
| EP | 0 630 865 A1 | 12/1994 |
| EP | 1156018 A1 | 11/2001 |
| EP | 1270523 A1 | 1/2003 |

* cited by examiner

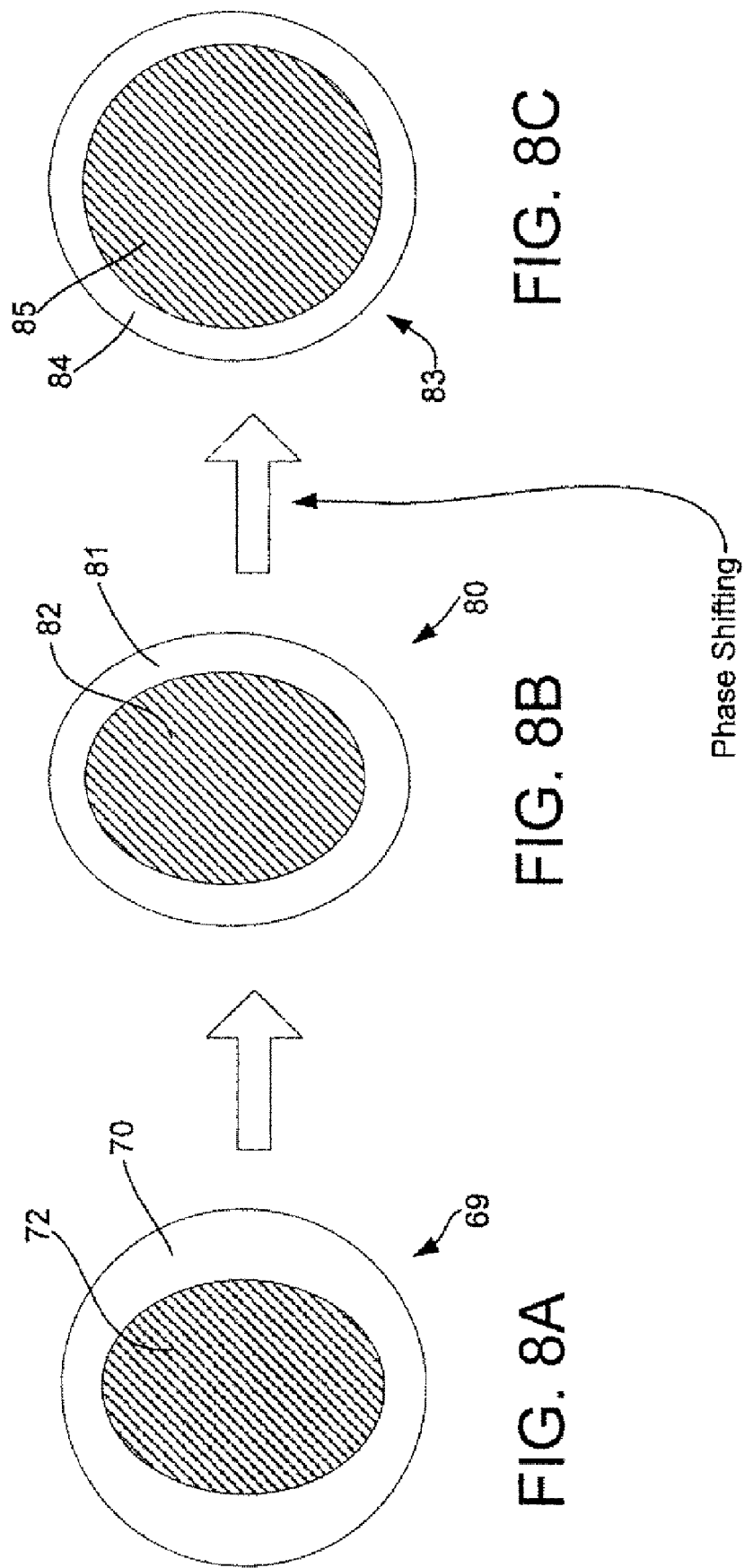

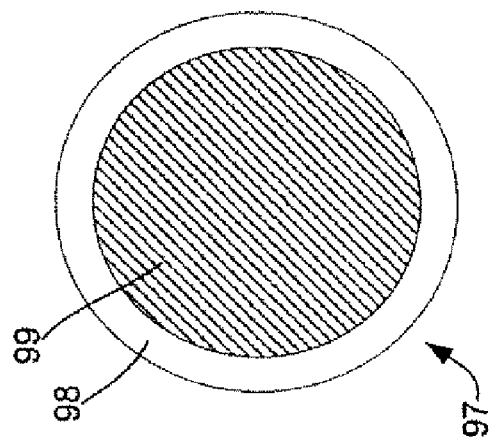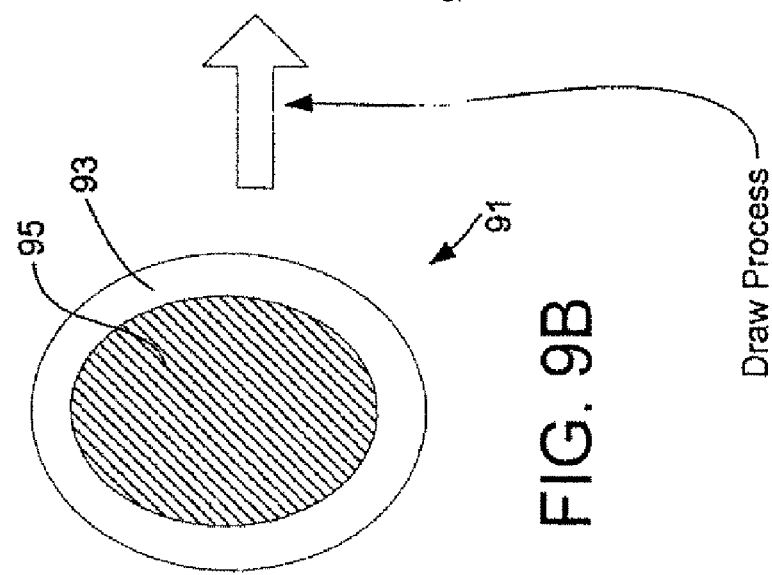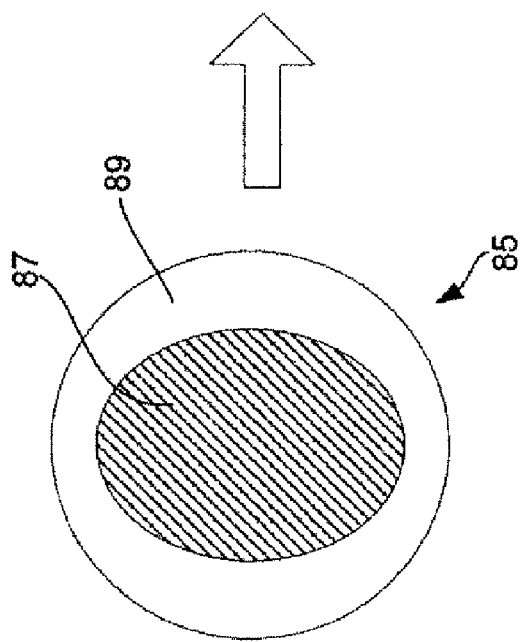

METHODS FOR MODIFYING OVALITY OF OPTICAL FIBER PREFORMS

CROSS REFERENCE TO RELATED APPLICATIONS

The present application is a continuation of U.S. application Ser. No. 11/672,836, filed Feb. 8, 2007, and entitled "Methods for Modifying Ovality of Optical Fiber Preforms," now abandoned, and which is a divisional of U.S. application Ser. No. 10/430,779, filed May 5, 2003, now abandoned, entitled "Methods for Modifying Ovality of Optical Fiber Preforms." The disclosures of both applications are incorporated by reference herein in their entirity.

FIELD OF THE INVENTION

The present invention relates generally to optical fiber fabrication, and more specifically, to methods for reducing the ovality of optical fiber preforms used in manufacturing optical fiber.

BACKGROUND OF THE INVENTION

Communications and data transmission systems that transmit information signals in the form of optical pulses over optical fiber are now commonplace, and optical fibers have become the physical transport medium of choice in long distance telephone, data and video communication networks due to their signal transmission capabilities, which greatly exceed those of mechanical conductors. Despite their advantages, however, difficulties in their manufacture must be overcome in order for lengthy, high-yield and error-free optical fiber to be produced in mass.

The manufacture of optical fiber utilizes a glass preform from which optical fiber is generated. The glass preform reproduces the desired index profile of the optical fiber in a thick glass rod. After a preform is created, it is loaded into a fiber drawing tower. The lower end of the preform is lowered into a furnace so that the end of the preform is softened until a softened glob falls down by gravity. As it falls, it forms a thread. The thread cools as it falls, and undergoes a series of processing steps (e.g., application of coating layers) to form the finished optical fiber. Therefore, it will be appreciated that the make-up and length of optical fiber generated by this process is dependent upon the characteristics of the preform from which the optical fiber is drawn.

The basic manufacturing steps of generating preforms are well known to those of skill in the art. Three basic forms for the production of preforms include: Internal Deposition, where material is grown inside a tube; Outside Deposition, where deposition is done on a mandrel removed in a later stage; and Axial Deposition, where deposition is done axially, directly on the glass preform. One of the most common and widely-used processes in optical fiber preform production is Modified Chemical Vapor Deposition (MCVD), which is a type of Internal Deposition. MCVD is a process for fabricating preforms wherein preform core material is deposited on the inside surface of a substrate or starting tube ('substrate tube' and 'starting tube' are used interchangeably herein). Individual layers of deposited material are turned into glass (vitrified) by a torch that moves back and forth along the length of the tube. During a deposition process the torch assembly slowly traverses the length of the starting tube while reactant gasses are fed into and exhausted from the tube. Following the deposition of core material and/or cladding material, the starting tube is collapsed to form a solid core rod by heating it to a higher temperature than during deposition. After the core rod is generated, during an overcladding process material such as silica is added to increase the diameter of the core rod. After overcladding, the optical fiber perform is complete and ready to be drawn into optical fiber.

Although the generation of preforms by the method described above are commonly utilized in optical fiber manufacturing, preforms generated by this process often suffer from ovality; that is, the preforms do not necessarily have a circular cross section throughout their entire length. Preform ovality is undesirable because it changes and more often increases the Polarization Mode Dispersion (PMD) of optical fiber. PMD is a stochastic phenomenon that leads to the dispersion of the optical pulses transmitted in an optical fiber. In particular, the dispersion is caused by the propagation speed difference between the polarization modes of the fiber. PMD limits the transmission capacity of optical communication systems by creating inter-symbol interference. Because low PMD is a desirable characteristic of optical fiber, reducing preform ovality is a crucial factor in achieving desirable transmission characteristics of optical fiber.

Therefore, what is needed is a method for achieving desired preform core ovality to reduce the PMD of an optical fiber generated there from.

BRIEF SUMMARY OF THE INVENTION

The present invention overcomes the disadvantages of the prior art by providing methods for reducing preform core ovality during and subsequent to the creation of an optical fiber preform. According to one embodiment of the present invention, prior to MCVD deposition on a starting tube, the outer diameter of the starting tube is altered by etching or a like process to reduce its ovality. According to another embodiment of the invention, after MCVD deposition forms the core rod, but prior to overcladding the core rod, the core rod may be etched, heated and rotated to reduce its ovality. Both methods may be used independently or in combination and are advantageous in that they reduce the PMD of optical fiber drawn from the optical fiber preform. According to a third embodiment of the present invention, the cladding material of a core rod having an oval or elliptical core may be etched to mirror the shape of the oval core. The preform generated there from may then be placed under a surface tension, or pulled in a manner to generate a circular optical fiber having low ovality and low PMD.

According to one embodiment of the present invention there is a disclosed method of reducing the ovality of an optical preform. The method includes the step of providing a starting tube having a wall, the wall having an exterior surface and an interior surface and wherein the interior surface defines a hollow region of the starting tube. The method also includes the step of etching the wall until the exterior of the wall includes a substantially circular cross section.

According to one aspect of the invention, etching the wall includes etching the wall using heating means, which may include a plasma torch. According to another aspect of the invention, the method further includes the step of measuring the ovality of the starting tube prior to etching the wall of the starting tube to determine the ovality of the starting tube. According to yet another aspect of the invention, etching the wall includes etching the wall only where the exterior of the wall is substantially oval in cross-section. The method may also include the step of rotating the starting tube as the starting tube is etched, and/or the step of removably mounting the starting tube to a lathe to etch the wall.

According to another embodiment of the present invention, there is a disclosed method of reducing the ovality of an optical preform. The method includes providing a core rod, the core rod comprising a core and a cladding layer, where the core includes an oval cross section, mounting the core rod on a lathe having at least two rotors, and rotating the core rod using the at least one of the two rotors. The method further includes subjecting the core rod to a heat source, where one of the at least two rotors is phase-shifted from another one of the at least two rotors after the core rod is mounted on the lathe.

According to one aspect of the invention, the method further includes the step of etching the core rod. According to another aspect of the invention, etching the wall includes etching the core rod using a heating device, which may be a plasma torch. According to yet another aspect of the invention, the method includes the step of measuring the ovality of the core rod prior to etching the core rod. The step of measuring can also include measuring the ovality of the cladding layer.

Furthermore, the step of etching can include etching the core rod only where the cladding layer is substantially oval in cross-section. Additionally, the step of rotating can include rotating the core rod as the core rod is etched. According to another aspect of the invention, the step of rotating includes the step of rotating the core rod in clockwise and counter-clockwise directions. Additionally, the angular velocity of the rotors may be equal during rotation.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 8A through 8C illustrate the ovality modification performed by the core rod ovality modification apparatus of FIG. 7.

FIGS. 9A through 9C illustrate the ovality modification performed by an ovality modification apparatus and draw process of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
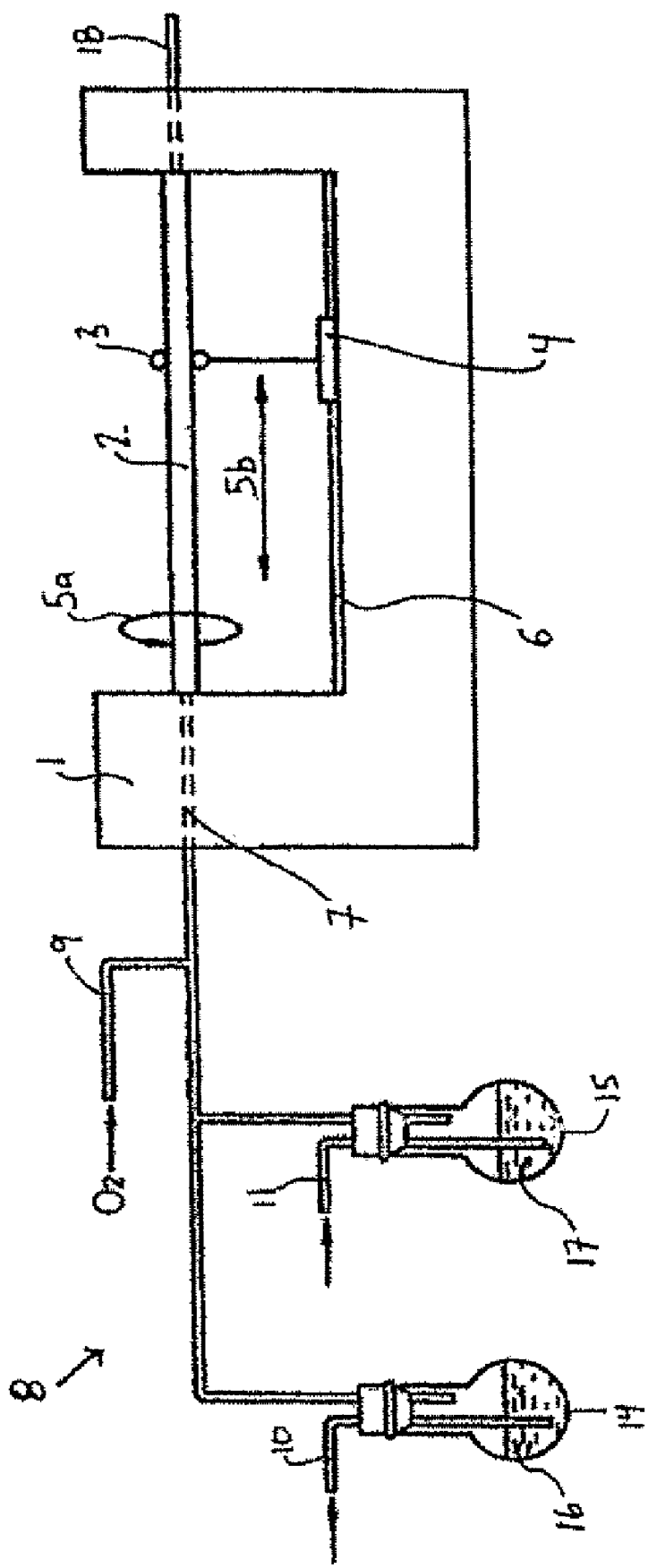
FIG. 1 is a diagram showing a general apparatus suitable for modified chemical vapor deposition (MCVD).

FIG. 1 shows an apparatus suitable for a MCVD process, as is known in the prior art. The apparatus includes a shelf 1 which supports a starting tube 2 and a heating means 4 that applies heat to a heating zone 3 of the starting tube 2. The starting tube 2 rotates, for example, in the direction indicated by an arrow 5a, and the heating means 4 reciprocates in the direction indicated by an arrow 5b by a moving member in track 6, so that the heating zone 3 is shifted along the entire starting tube 2 while the starting tube rotates. A source gas is introduced via a supply pipe 7 to the starting tube 2, and the supply pipe 7 is connected to a source material storage portion 8. The source material storage portion 8 has an inlet 9 for oxygen. Storage tanks 14 and 15 contain reaction materials 16 and 17, which are usually liquids, and the reaction materials 16 and 17 enter the starting tube 2, carried by carrier gases input via inlets 10 and 11. Also, the excited material is discharged via an outlet 18. A mixing valve (not shown) and a blocking valve (not shown) measure the flow of gases and perform other adjustments required for mixing. During a deposition process the torch assembly slowly traverses the length of the starting tube 2 while the reaction materials and oxygen are fed into and exhausted from the supply pipe 7. Following the deposition of core and/or cladding material (in opposite order—i.e., cladding material is deposited before core material is deposited), the starting tube 2 is collapsed to form a solid core rod by heating it to a higher temperature than during deposition, as is next illustrated in FIGS. 2A through 2C.

Figure 2A:
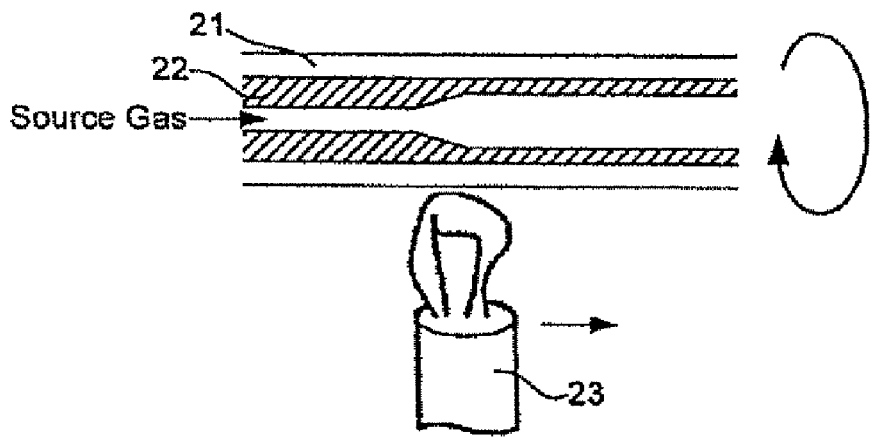
FIGS. 2A through 2C are diagrams illustrating a general MCVD method.
Figure 2B:
Figure 2C:
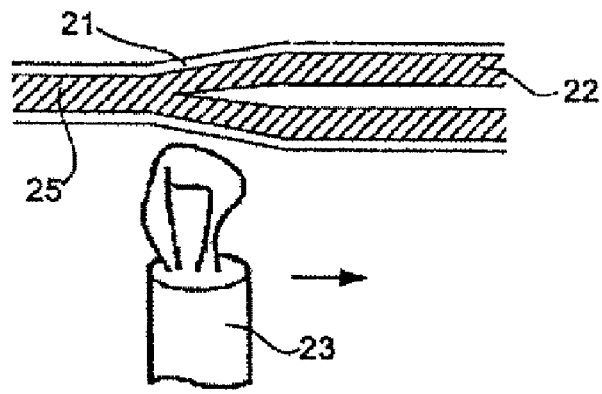

FIGS. 2A through 2C are diagrams illustrating the collapsing of the starting tube 2 on the deposited materials to form an optical preform. As illustrated with respect to FIG. 1, in the MCVD process, a high-purity source gas such as $SiCl_4$, $GeCl_4$, $POCl_3$, $BCl_3$ or $CF_4$, is introduced together with oxygen into a glass starting tube 21, and the starting tube 21 is heated by the heating means 23, resulting in soot, an oxidation deposit, on the inside of the starting tube 21 formed by thermal oxidation (see FIG. 2A). Here, the concentration of the source gas is accurately adjusted under the control of a computerized system to control a refractive index, to thereby deposit a core and/or cladding layer 22 inside the starting tube 21 (see FIG. 2B). Then, the starting tube 21 on which the cladding and/or core layer 22 have been deposited is heated by the heating means 23, and collapsed to form an optical fiber preform 25.

Figure 3A:
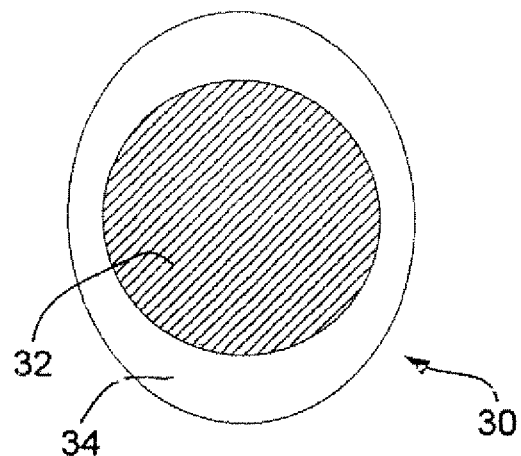
FIGS. 3A through 3C illustrate cross-sections of undesirable preform geometries generated by a conventional MCVD process, according to illustrative examples of the present invention.
Figure 3B:
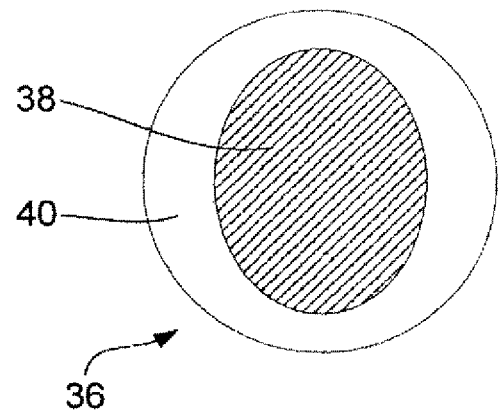
Figure 3C:
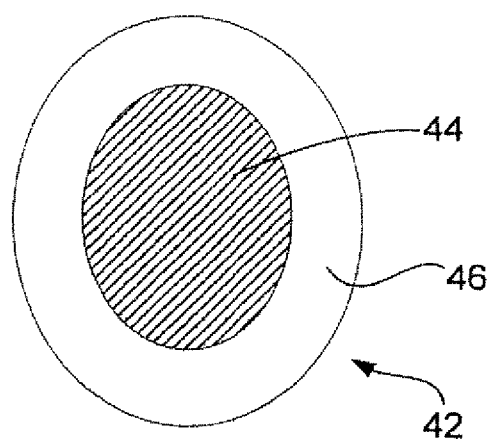

Though the MCVD process described above is widely used to generate optical fiber, undesirable ovality of preforms formed thereby often results. Ovality occurs when one or more of the successive layers of material comprising the preform have varying thicknesses or are oval, rather than circular, in their cross section. FIGS. 3A through 3C illustrate some of the undesirable preform geometries generated by the MCVD process. FIG. 3A illustrates the cross-section of a core rod 30 having an oval cladding layer 34 with a substantially non-oval, or circular, core 32. A core rod is generated by the MCVD process, but prior to the generation of an optical fiber preform by the subsequent addition of an overcladding layer, as is known in the art. For the purposes of this application, core and/or cladding materials deposited within a starting tube are referred hereinafter collectively as the core. The core is surrounded by the starting tube, which is collapsed on the core during the MCVD process, as described above with respect to FIGS. 2A-2C; thus, the combination of the core and collapsed starting tube includes the core rod. FIG. 3B illustrates the cross-section of a core rod 36 having an oval core 38 with a substantially non-oval, or circular, cladding layer 40. Finally, FIG. 3C illustrates the cross-section of a core rod 42 having both an oval core 44 and oval cladding layer 46.

As noted above, increased ovality of an optical preform increases the PMD of optical fiber drawn there from. PMD is a stochastic phenomenon that leads to the dispersion of the optical pulses transmitted in an optical fiber. In particular, the dispersion is caused by the propagation speed difference between the polarization modes of the fiber. PMD limits the transmission capacity of optical communication systems by creating inter-symbol interference. Because low PMD is a desirable characteristic of optical fiber, modifying preform core ovality to reduce PMD is a crucial factor in achieving desirable transmission characteristics of optical fiber.

According to one embodiment of the present invention, one method of modifying the ovality of an optical preform is by changing the ovality of the starting tube prior to MCVD deposition. It will be appreciated by those of skill in the art that starting tube outer diameter (OD) ovality plays a significant role in preform core ovality after MCVD deposition. In fact, starting tube outer diameter ovality correlates directly with preform core ovality and PMD. Furthermore, it is known that preform core ovality and PMD are relatively insensitive to the inner diameter (ID) of starting tubes.

Figure 4:
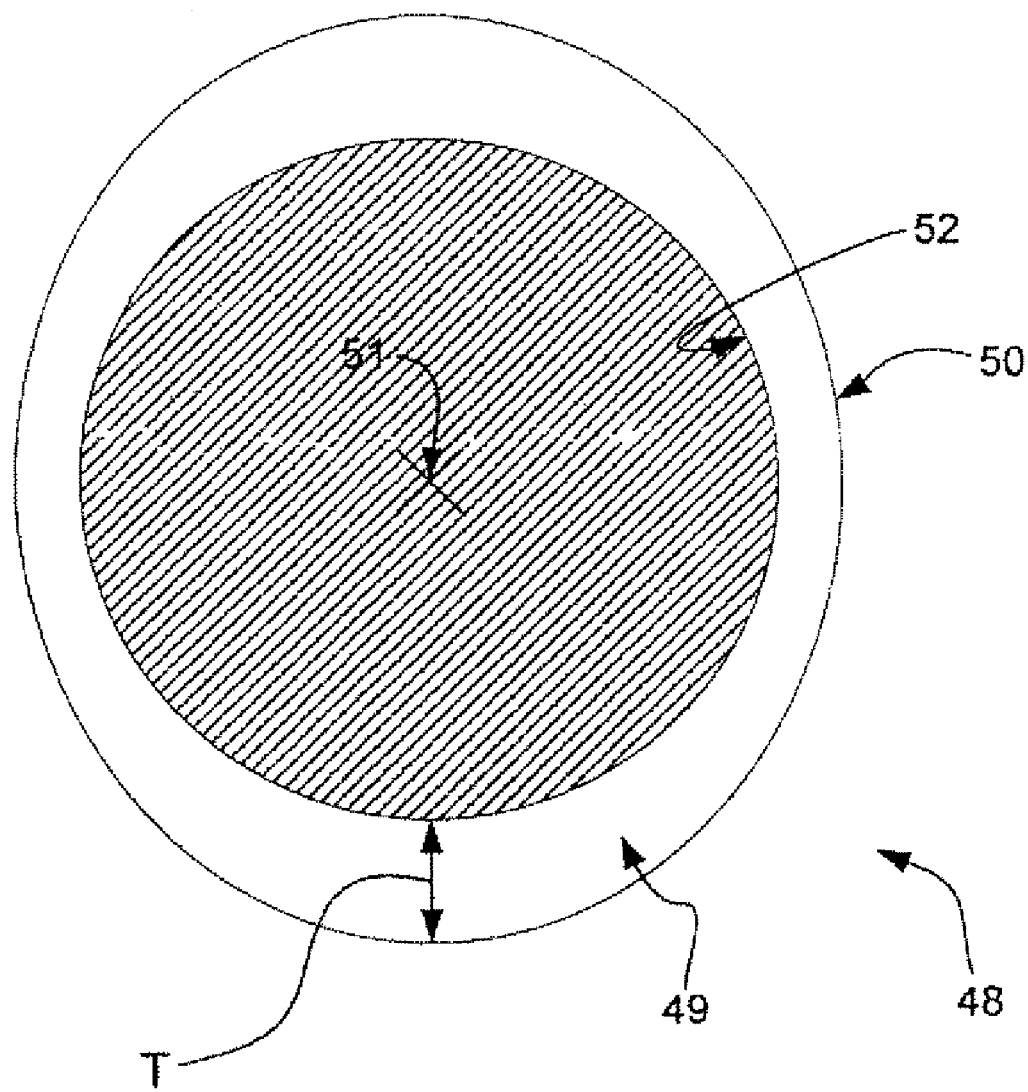
FIG. 4 shows a cross-sectional view of a starting tube having a non-uniform thickness, according to an illustrative example of the present invention.

FIG. 4 shows a cross-sectional view of a starting tube 48 having undesirable high ovality, according to an illustrative example of the present invention. As illustrated, the starting tube 48 comprises a starting tube wall 49 having a thickness T that varies around the circumference of the starting tube 48. Thus, not all portions along the exterior surface 50 of the wall 49 are equidistant from a center longitudinal axis 51 running the length of the tube 48. On the other hand, in this example, the interior surface 52 of the wall 49 is substantially equidistant from the center longitudinal axis 51.

Figure 5:
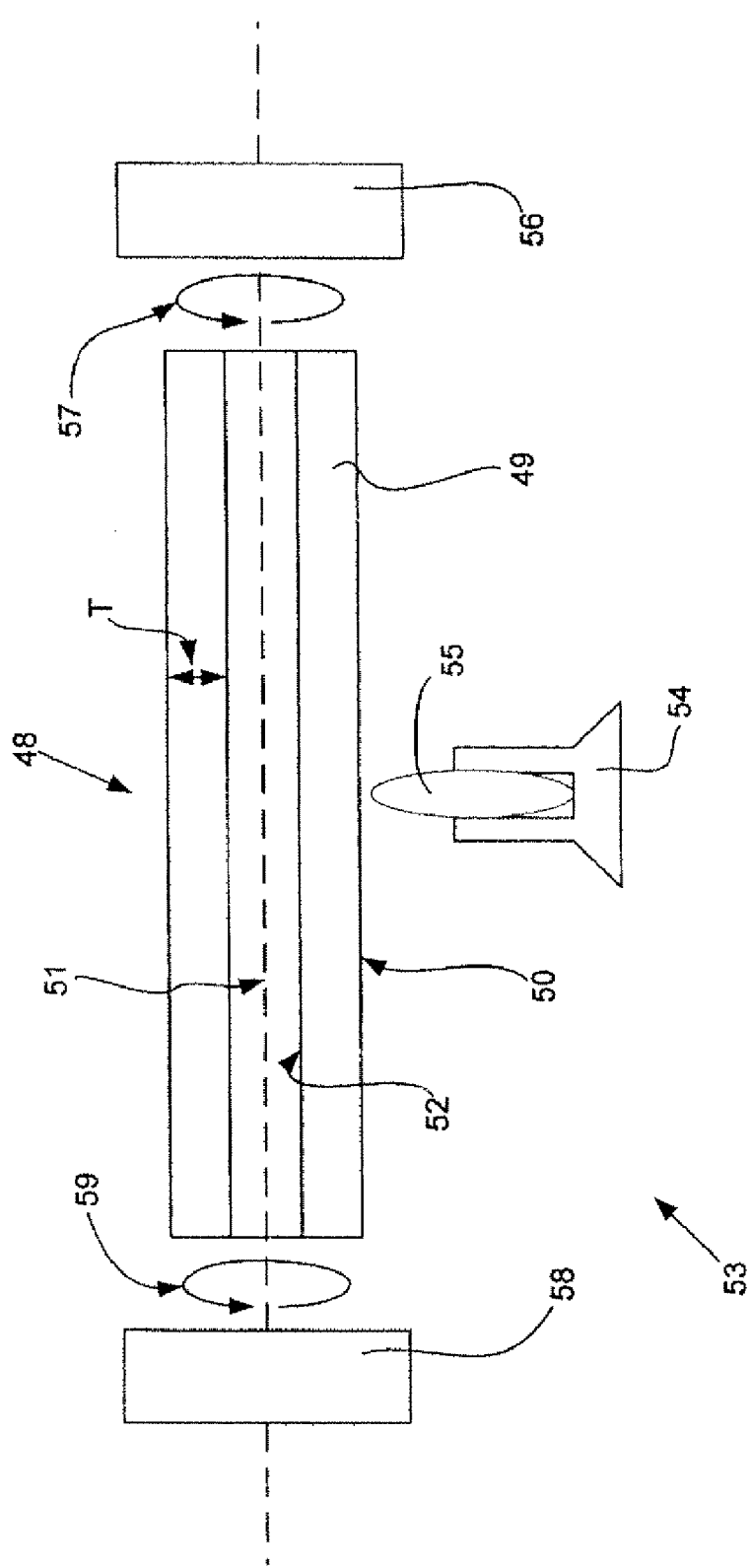
FIG. 5 shows a bisected view of a starting tube ovality modification apparatus upon which a starting tube is attached, according to one embodiment of the present invention.

FIG. 5 shows a bisected view of the starting tube 48 removably mounted on a starting tube ovality modification apparatus 53, according to one embodiment of the present invention. The starting tube ovality modification apparatus 53 improves the starting tube 48 OD ovality (or starting tube wall 49 uniformity) by using a heat source on the starting tube 48 to modify its OD ovality prior to MCVD deposition. More specifically, the apparatus 53 includes a lathe (not illustrated), such as a glassworking lathe, upon which the starting tube 48 is mounted. The lathe is operable to rotate 57, 59 the tube 48 around the center longitudinal axis 51 passing through the length of the tube 48. According to a preferred embodiment of the present invention, the lathe's rotation is controlled by two rotors 56, 58. The rotational velocities of the two rotors 56, 58 are synchronized and locked together during the etching process so no twist is imparted to the starting tube 48. An illustrative lathe is described in U.S. Pat. No. 6,178,779, the entire contents of which are incorporated herein by reference. Because the structure and operation of lathes are well known to those of ordinary skill in the art, they are not described further herein.

Referring again to FIG. 5, the starting tube 48 is removably mounted adjacent to an isothermal plasma torch 54, as is well known in the art, which generates a plasma fireball 55. The plasma torch 54 is mounted on a movable support which permits it to traverse the length of the starting tube 48. Therefore, in combination with the rotation provided by the rotors 56, 58, the plasma torch can heat any outside portion of the starting tube 48. A variety of isothermal plasmas may be used by the apparatus 53 of the present invention. Examples include oxygen and oxygen-containing plasma, e.g., oxygen/argon. The plasma is typically hydrogen-free, such that OH impurities in the resulting article are substantially avoided. The plasma fireball 55 heats and etches the exterior surface 50 of the starting tube wall 49, thereby removing glass from the starting tube wall 49. Generally, the longer the plasma fireball 55 heats a particular portion of the starting tube wall 49, the greater the amount of glass etched there from. It will be appreciated that the etching does not affect the interior surface 52 of the wall 49.

Selectively etching the outside of the starting tube wall 49 where it is too thick, such as in the 12 o'clock and 6 o'clock positions in the illustrative cross-sectional view of a starting tube 48 in FIG. 4, reduces the thickness of the wall 49 such that a constant or near constant wall thickness, and reduced ovality, is achieved. According to one aspect of the invention, up to 1 mm of material may be removed from the OD of the wall 49 to make the OD perfectly or near perfectly uniform.

The reduced ovality of the starting tube OD reduces the PMD of an optical fiber drawn there from, thereby enhancing the transmission characteristics of the resulting optical fiber.

It will be appreciated by those of ordinary skill in the art that the preferential etching of the starting tube wall 49 or OD ovality is achieved by varying the rotational velocity of the tube 48 as a function of the starting tube ovality. Therefore, the slower the rotation of the starting tube 48, the greater the amount of glass is etched away. To control the portions of the tube 48 that are etched, the OD ovality of the starting tube 48 can be scanned prior to etching either on-line or off-line. Off-line scanners are well known to those of ordinary skill in the art for measuring starting tube dimensions and ovality. However, such scanners have not been integrated with a system to control a plasma torch or other heat source in a closed loop system to modify OD ovality. Alternatively, on-line scanning can be done with laser devices, as are well known in the art. According to one embodiment of the present invention, the ovality of the starting tube 48 is calculated by scanning equipment configurable to measure the ovality of the tube 48 at any cross section along the entire length of the tube 48. The scanning equipment is in electrical communication with the starting tube ovality modification apparatus 53 to communicate the requisite rotational speed and location of the plasma torch 54 to reduce the OD of the starting tube 48 where necessary to produce a substantially non-oval and circular OD. Alternatively, measurements can be made manually and entered into the starting tube ovality modification apparatus 53 using an input means well known in the art.

Figure 6:
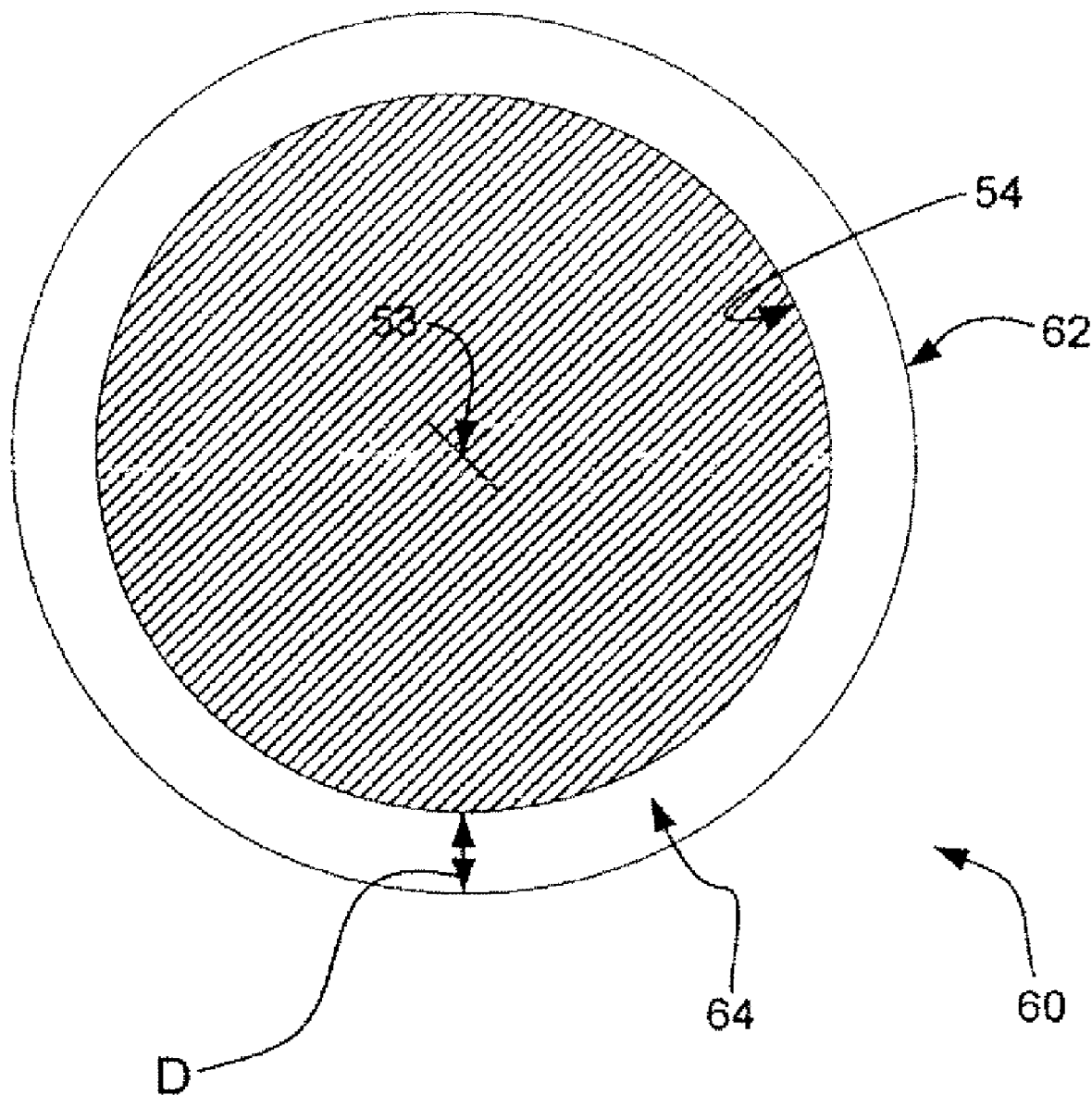
FIG. 6 shows a cross-section view of a corrected starting tube having a substantially circular outside diameter and uniform thickness, according to one aspect of the present invention.

FIG. 6 shows an illustrative cross-section of the starting tube of FIG. 4 after its OD ovality is reduced by the starting tube ovality modification apparatus 53. The corrected starting tube 60 has a substantially uniform thickness D between the interior surface 54 of the starting tube wall 64 and the exterior surface 62 of the starting tube wall 64. Therefore, the exterior surface 62 of the tube 60 is substantially equidistant, along its entire surface, to the center longitudinal axis 53 passing through the length of the tube 60. Once the starting tube ovality is achieved using the apparatus and method described above, MCVD deposition using the modified starting tube can proceed, the MCVD deposition utilizing the modified starting tube ensuring lower PMD, and hence enhanced optical fiber transmission characteristics, than would otherwise be achieved if the starting tube OD ovality was left unchanged prior to MCVD deposition.

According to another embodiment of the invention, after MCVD deposition forms the core rod, but prior to overcladding the core rod to produce the full preform, the core rod is etched to modify its ovality. This method may be used independently or in combination with the methods for eliminating or reducing starting tube ovality, discussed in detail above. Etching the core rod properly can also reduce the PMD of optical fiber drawn from an optical preform.

Figure 7:
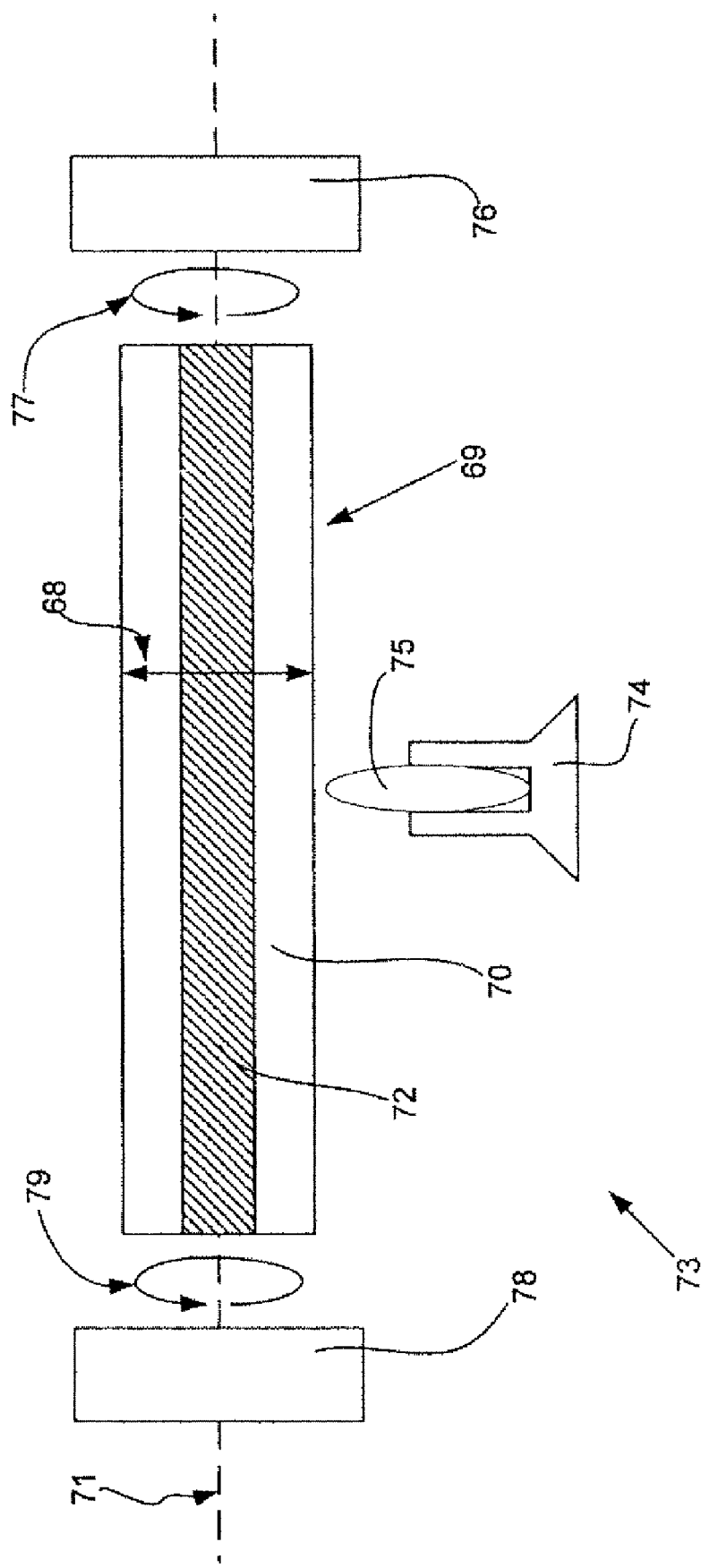
FIG. 7 shows a bisected view of a core rod ovality modification apparatus upon which a core rod is attached, according to one embodiment of the present invention.

FIG. 7 shows a bisected view of a core rod ovality modification apparatus 73 upon which a core rod 69 is removably attached, according to one embodiment of the present invention. The apparatus 73 is substantially similar to the apparatus discussed with reference to FIG. 5, above. The core rod ovality modification apparatus 73 improves the core rod 69 ovality by using a heat source on the core rod in combination with spinning of the core rod 69 to improve the ovality of both the core 72 and overcladding layer 70 of the core rod 69. As in FIG. 7, the apparatus 73 includes a lathe (not illustrated), such as a glassworking lathe, upon which a core rod 69 having undesirable ovality is mounted. The lathe is operable to rotate 77, 79 the core rod 69 around the center longitudinal axis 71 passing through the length of the core rod 69. According to one illustrative embodiment of the present invention, the core rod 69 initially has the geometry illustrated in FIG. 8A including an oval core 72 and an oval cladding layer 70.

Referring again to FIG. 7, the core rod 69 is removably mounted adjacent to an isothermal plasma torch 74, as is well known in the art, which generates a plasma fireball 75 as described above. Like the apparatus of FIG. 7, the plasma torch 74 is mounted on a movable support which permits it to traverse the length of the core rod 69. The plasma fireball 75 heats and etches the exterior surface of the core rod 69, thereby removing glass from exterior portions of the cladding layer 70. Generally, the longer the plasma fireball 75 heats a particular portion of the cladding layer 70, the greater the amount of glass etched there from. It will be appreciated that the etching does not affect the core 72 of the core rod 69.

More specifically, according to one embodiment of the invention, the apparatus 73 preferentially etches the OD 68 of the core rod 69 until the cladding layer 70 is substantially similar to the shape of core in cross-section. The results of the preferential etching are illustrated in FIG. 8B. The preferential etching reduces the thickness of some or select portions of the overcladding layer 70 of FIG. 8A such that the thickness of the overcladding layer 81 is substantially consistent or constant around the core 82. Next, while the core rod 69 continues to be heated along the length of its oval sections, the rotors 76, 78, which control the lathe's rotation, are phase-shifted as a function of the core rod's 69 ovality along its entire length.

According to one aspect of the present invention, the phase shift is calculated as a function of its ovality:

$$\Delta\Theta = f(O_v) = A \sin(\Omega t) = K*O_v*\sin(\Omega t)$$

where $\Delta\Theta$ is the amount of phase shift in degrees or radius as a function of ovality, position and time; $O_v$ is the ovality in % (e.g., (max−min)/(max+min)/2) as a function of position; K is a conversion constant; and $\Omega$ is a frequency at which the core rod spins (clockwise and counter-clockwise) are alternated. This phase-shift operation provides a "spin motion" of the core rod to improve its ovality.

According to one aspect of the invention, the angular velocity of the two rotors 76, 78 are synchronized but for transmission time periods during the phase shifting. Additionally, it will be appreciated that it is advantageous to alternate the phase-shift between positive and negative—i.e., between clockwise and counterclockwise directions. This prevents any permanent twist from being imparted in the core rod. The effect of the phase shift or spinning motion is to average out and improve the core 72 ovality. Furthermore, when combined with surface tension created by preferential etching, phase-shifting or spinning the core rod 69 will perturb the core 72 to redistribute it to a more circular shape. Therefore, phase-shifted rotation of the oval core rod 80 having an oval core 82 will result in the core rod 83 illustrated in FIG. 8C, which includes a substantially circular core 85 and cladding layer 84. Therefore, selectively etching the outside of the core rod 69 to match the oval or elliptical shape of the core, followed by phase-shifted rotation of the core rod 69, reduces the ovality of the core rod 69 thereby reducing the PMD of an optical fiber drawn there from. Therefore, methods of the present invention enhance the transmission characteristics of the resulting optical fiber. It will also be appreciated that where the cladding layer substantially circular, the core rod ovality correction apparatus 73 need perform the initial step of etching the cladding layer 70 before rotating the core rod to achieve a preform having low ovality.

Like the embodiment described with respect to FIG. 7, it will be appreciated by those of ordinary skill in the art that the preferential etching of the cladding layer 70 of core rod 69 is achieved by varying the rotational velocity of the core rod 69 as a function of the core rod ovality. Therefore, the slower the rotation of the core rod 69, the greater the amount of glass is etched away. To control the portions of the core rod 69 that are etched, the OD 68 ovality of the core rod 69 can be scanned prior to etching either on-line or off-line. According to one embodiment of the present invention, the ovality of the core rod 69 is calculated by scanning equipment configurable to measure the ovality of the rod 69 at any cross section along its entire length. The scanning equipment is in electrical communication with the core rod ovality modification apparatus 73 to communicate the requisite rotational speed and location of the plasma torch 74 to match the OD 68 of the core rod 69 with the core 72 such that the relative exterior surfaces of the respective layers are substantially congruent. Alternatively, measurements can be made manually and entered into the core rod ovality modification apparatus 73 using an input means well known in the art.

According to yet another embodiment of the present invention, the cladding material of a preform having an oval or elliptical core may be etched to mirror the shape of the oval core. Thereafter the perform may be placed under a surface tension, or pulled in a manner to generate a circular optical fiber having low ovality and low PMD. FIGS. 9A through 9C illustrate the ovality modification performed by an ovality modification apparatus and method of the present invention. According to one illustrative embodiment of the present invention, the core rod 85 initially has the geometry illustrated in FIG. 9A. The core rod geometry is similar to that geometry shown in FIGS. 3B and 8B, including an oval core 87 and a substantially circular cladding layer 89.

Using the core rod ovality modification apparatus 73, OD of the core rod is preferentially etched to match the shape of the core 87. The results of the preferential etching are illustrated in FIG. 9B. As shown in FIG. 9B, the preferential etching reduces the thickness of some or select portions of the overcladding layer 93 of FIG. 9A such that the thickness of the overcladding layer is substantially consistent or constant around the core 95. Therefore, in the core rod 91 illustrated in FIG. 9B the overcladding layer 93 is congruent with the core 91. After this modification is made, the core rod 91 is prepared for and subjected to overcladding (not illustrated), as is well known in the art.

Next, the resulting perform is subjected to the draw process. During the drawing of optical fiber from the draw tower a surface tension is used, in combination with a drawing speed effected by a longer melt zone to draw the preferentially etched perform to effect optical fiber having a substantially circular cross section of core 99 and cladding layer 98 illustrated in the cross-sectional view of the core and cladding layers of an optical fiber 97 illustrated in FIG. 9C. It is well known to those of ordinary skill in the art how a surface tension may be applied to create substantially circular core and cladding layers (i.e., in cross-section) from an elliptically-shaped core rod and cladding layer such as those illustrated in FIG. 9B. According to one aspect of the invention, the temperature at which the fiber is typically drawn (i.e., drawn without the need for a geometry modification) may be increased to encourage the creation of the cross-section shown in FIG. 9C. Furthermore, during drawing, the fiber may be spun in clockwise and counterclockwise directions to encourage the geometry modification taking place between FIGS. 9B and 9C. Like the above-described methods, this process results in an optical fiber having low ovality and low PMD, and thus, advantageous transmission capabilities.

Many modifications and other embodiments of the inventions set forth herein will come to mind to one skilled in the art to which these inventions pertain having the benefit of the teachings presented in the foregoing descriptions and the associated drawings. Thus, it will be appreciated by those of ordinary skill in the art that the present invention may be embodied in many forms and should not be limited to the embodiments described above. As an example, although the above apparatus and methods are disclosed with respect to a MCVD process, the inventions disclosed herein may be used with a variety of optical fiber fabrication processes, such as VAD processing. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of modifying the cross-section shape of a generally cylindrical optical core rod, the method comprising:

providing a core rod comprising a core and a layer of cladding material surrounding the core, wherein a cross-section shape of the core is substantially oval along a length of the core rod;

mounting the core rod on a lathe having a first rotor attached to one end of the core rod and a second rotor attached to an opposite end of the core rod;

scanning the core rod to measure the cross-section shape of the substantially oval core;

preferentially etching the core rod with a plasma torch to alter an outside diameter of the cladding layer to substantially match the cross-section shape of the substantially oval core;

rotating the core rod by spinning the rotors in the same direction at substantially the same angular velocity;

creating a phase shift between the first and second rotors by varying the angular velocity of at least one of the rotors; and alternating the phase shift between clockwise and counterclockwise directions to perturb the substantially oval core and redistribute the core to a more circular shape, wherein the etching of the core rod comprises rotating the core rod at a rotational velocity that varies as a function of the measured cross-section shape of the substantially oval core as the core rod is etched.

2. The method of claim 1, wherein etching the core rod comprises etching the core rod until a thickness of the cladding layer is substantially constant around the substantially oval core along the length of the core rod.

3. The method of claim 1, wherein the etching of the core rod produces a core rod having less than 5% core ovality.

4. The method of claim 1, wherein the etching of the core rod produces a core rod suitable for producing optical fiber having less than 0.1 ps/sqrt (km) of polarization mode dispersion.

5. The method of claim 1, wherein the scanning of the core rod comprises an off-line scanning of said core rod.

6. The method of claim 1, wherein the scanning of the core rod comprises an on-line scanning of said core rod.

7. The method of claim 1, wherein an angular velocity of the first rotor and an angular velocity of the second rotor are synchronized when the phase shift is not being formed.

8. The method of claim 1, wherein the phase shift between the rotation of the first rotor and the rotation of the second rotor is based at least in part on the ovality of the optical core rod.

9. The method of claim 1 further comprising drawing optical fiber from the core rod.

* * * * *